United States Patent
Aramata et al.

(10) Patent No.: US 9,608,262 B2
(45) Date of Patent: Mar. 28, 2017

(54) SILICON COMPOSITE, MAKING METHOD, AND NON-AQUEOUS ELECTROLYTE SECONDARY CELL NEGATIVE ELECTRODE MATERIAL

(71) Applicant: Shin-Etsu Chemical Co., Ltd., Tokyo (JP)

(72) Inventors: Mikio Aramata, Usui-gun (JP); Satoru Miyawaki, Usui-gun (JP); Hirofumi Fukuoka, Usui-gun (JP); Kazuma Momii, Usui-gun (JP); Kouichi Urano, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/635,464

(22) Filed: Mar. 2, 2015

(65) Prior Publication Data
US 2015/0171425 A1    Jun. 18, 2015

Related U.S. Application Data

(62) Division of application No. 12/883,558, filed on Sep. 16, 2010, now abandoned, which is a division of (Continued)

(30) Foreign Application Priority Data
Jul. 1, 2004    (JP) ................................. 2004-195586

(51) Int. Cl.
H01M 4/36        (2006.01)
H01M 4/04        (2006.01)
(Continued)

(52) U.S. Cl.
CPC ......... *H01M 4/366* (2013.01); *H01M 4/0421* (2013.01); *H01M 4/13* (2013.01); *H01M 4/134* (2013.01); *H01M 4/139* (2013.01); *H01M 4/38* (2013.01); *H01M 4/386* (2013.01); *H01M 4/58* (2013.01); *H01M 10/44* (2013.01); *H01M 10/052* (2013.01); *H01M 2004/027* (2013.01);
(Continued)

(58) Field of Classification Search
None
See application file for complete search history.

(56) References Cited

U.S. PATENT DOCUMENTS 5,322,824 A    6/1994   Chia
5,395,711 A    3/1995   Tahara et al.
(Continued)

FOREIGN PATENT DOCUMENTS

JP    5-174818    7/1993
JP    6-60867     3/1994
(Continued)

*Primary Examiner* — Alix Eggerding
(74) *Attorney, Agent, or Firm* — Oblon, McClelland, Maier & Neustadt, L.L.P.

(57) ABSTRACT

A silicon composite comprises silicon particles whose surface is at least partially coated with a silicon carbide layer. It is prepared by subjecting a silicon powder to thermal CVD with an organic hydrocarbon gas and/or vapor at 900-1,400° C., and heating the powder for removing an excess free carbon layer from the surface through oxidative decomposition.

13 Claims, 1 Drawing Sheet

IMAGE OF SILICON COMPOSITE PARTICLE

Related U.S. Application Data application No. 11/166,173, filed on Jun. 27, 2005, now abandoned.

(51) Int. Cl.

| | |
|---|---|
| *H01M 4/13* | (2010.01) |
| *H01M 4/139* | (2010.01) |
| *H01M 4/38* | (2006.01) |
| *H01M 4/58* | (2010.01) |
| *H01M 4/134* | (2010.01) |
| *H01M 10/44* | (2006.01) |
| *H01M 10/052* | (2010.01) |
| *H01M 4/02* | (2006.01) |

(52) U.S. Cl.
CPC ............ *Y02E 60/122* (2013.01); *Y02P 70/54* (2015.11); *Y10T 428/2993* (2015.01)

(56) References Cited

U.S. PATENT DOCUMENTS

| | | | |
|---|---|---|---|
| 5,478,671 A | 12/1995 | Idota | |
| 5,944,963 A * | 8/1999 | Ruppel | C04B 35/565 |
| | | | 204/192.15 |
| 6,066,414 A | 5/2000 | Imoto et al. | |
| 6,235,427 B1 * | 5/2001 | Idota | H01M 4/134 |
| | | | 29/623.1 |
| 6,235,727 B1 | 5/2001 | Schudok et al. | |
| 6,383,686 B1 | 5/2002 | Umeno et al. | |
| 6,638,662 B2 | 10/2003 | Kaneda et al. | |
| 6,835,496 B1 | 12/2004 | Kaminaka et al. | |
| 2002/0081861 A1 | 6/2002 | Robinson et al. | |
| 2003/0215711 A1 | 11/2003 | Aramata et al. | |
| 2005/0253313 A1 | 11/2005 | Rashed | |

FOREIGN PATENT DOCUMENTS

| | | |
|---|---|---|
| JP | 10-294112 | 11/1998 |
| JP | 11-102705 | 4/1999 |
| JP | 2997741 | 11/1999 |
| JP | 2000012088 | 1/2000 |
| JP | 2000-215887 | 8/2000 |
| JP | 2000-243396 | 9/2000 |
| JP | 2002-42806 | 2/2002 |
| JP | 2002-56843 | 2/2002 |

\* cited by examiner

IMAGE OF SILICON COMPOSITE PARTICLE

X-RAY DIFFRACTION (Cu-Kα) DIAGRAM OF SiC-COATED SILICON POWER

SILICON COMPOSITE, MAKING METHOD, AND NON-AQUEOUS ELECTROLYTE SECONDARY CELL NEGATIVE ELECTRODE MATERIAL

CROSS-REFERENCE TO RELATED APPLICATION

This non-provisional application is a Divisional Application of U.S. patent application Ser. No. 12/883,558, filed on Sep. 16, 2010, which was a Divisional Application of U.S. patent application Ser. No. 11/166,173, filed on Jun. 27, 2005, and claims priority under 35 U.S.C. §119(a) to Patent Application No. 2004-195586 filed in Japan on Jul. 1, 2004, the entire contents of which are hereby incorporated by reference.

TECHNICAL FIELD

This invention relates to a silicon composite powder having a capacity controlled to compensate for the drawback of silicon which is believed useful as lithium ion secondary cell negative electrode active material; a method for preparing the same; and a non-aqueous electrolyte secondary cell negative electrode material comprising the powder.

BACKGROUND ART

With the recent remarkable development of potable electronic equipment, communications equipment and the like, a strong demand for high energy density secondary batteries exists from the standpoints of economy and size and weight reductions. One prior art method for increasing the capacity of secondary batteries is to use oxides as the negative electrode material, for example, oxides of V, Si, B, Zr, Sn or the like or complex oxides thereof (see JP-A 5-174818 and JP-A 6-060867 corresponding to U.S. Pat. No. 5,478,671), metal oxides quenched from the melt (JP-A 10-294112), silicon oxide (Japanese Patent No. 2,997,741 corresponding to U.S. Pat. No. 5,395,711), and $Si_2N_2O$ and $Ge_2N_2O$ (JP-A 11-102705 corresponding to U.S. Pat. No. 6,066,414). Conventional methods of imparting conductivity to the negative electrode material include mechanical alloying of SiO with graphite, followed by carbonization (see JP-A 2000-243396 corresponding to U.S. Pat. No. 6,638,662), coating of silicon particles with a carbon layer by chemical vapor deposition (JP-A 2000-215887 corresponding to U.S. Pat. No. 6,383,686), and coating of silicon oxide particles with a carbon layer by chemical vapor deposition (JP-A 2002-42806). None of these patents relates to the method of alleviating a substantial volume change of a silicon negative electrode during charge/discharge cycles which is an outstanding problem characteristic of the silicon negative electrode nor the method of reducing the current collection associated with the volume change. It remains an important task to establish such techniques.

The prior art methods using silicon as such or making its surface conductive for improving the cycle performance of negative electrode material are successful in increasing the charge/discharge capacity and energy density, but are not necessarily satisfactory because of failure to fully meet the characteristics required in the market, particularly the cycle performance of importance in mobile phone and other applications. There is a desire for further improvement in cycle performance.

In particular, Japanese Patent No. 2,997,741 uses silicon oxide as the negative electrode material in a lithium ion secondary cell to provide an electrode with a high capacity. As long as the present inventors have confirmed, there is left a room for further improvement as demonstrated by a still high irreversible capacity on the first charge/discharge cycle and cycle performance below the practical level. With respect to the technique of imparting conductivity to the negative electrode material, JP-A 2000-243396 suffers from the problem that solid-to-solid fusion fails to form a uniform carbon coating, resulting in insufficient conductivity. In the method of JP-A 2000-215887 which can form a uniform carbon coating, the negative electrode material based on silicon undergoes excessive expansion and contraction upon adsorption and desorption of lithium ions, meaning impractical operation, and loses cycle performance. Thus, the charge/discharge quantity must be limited. In JP-A 2002-42606, despite a discernible improvement of cycle performance, due to precipitation of silicon crystallites, insufficient structure of the carbon coating and insufficient fusion of the carbon coating to the substrate, the capacity gradually lowers as charge/discharge cycles are repeated, and suddenly drops after a certain number of charge/discharge cycles. This approach is thus insufficient for use in secondary cells.

SUMMARY OF THE INVENTION

An object of the present invention is to provide a silicon composite which maintains the high initial efficiency inherent to silicon, has excellent cycle performance, and has alleviated a substantial volume change during charge/discharge cycles so that it is effective as active material for lithium ion secondary cell negative electrodes; a method for preparing the same; and a non-aqueous electrolyte secondary cell negative electrode material comprising the silicon composite.

The inventor has discovered a silicon composite which maintains the high initial efficiency inherent to silicon, has excellent cycle performance, and has alleviated a substantial volume change during charge/discharge cycles and which is thus effective as the active material for lithium ion secondary cell negative electrodes.

The development of an electrode material having an increased charge/discharge capacity is very important and many engineers have been engaged in the research and development thereof. Under the circumstances, silicon and amorphous silicon oxides represented by the general formula SiO, wherein $1.0 \le x < 1.6$ are of great interest as the negative electrode active material for lithium ion secondary cells because their capacity is large. Only few of them have been used in practice because of their shortcomings including substantial degradation upon repeated charge/discharge cycles, that is, poor cycle performance and in particular, low initial efficiency.

Making investigations from such a standpoint with the target of improving cycle performance and initial efficiency, the inventor found that CVD treatment of silicon oxide powder led to a substantial improvement in performance as compared with the prior art. However, this approach starting with silicon oxide left the problem of low initial efficiency due to the presence of oxygen atoms. The problem could, of course, be solved by some means, for example, by the addition of phenyl lithium which is known as a method for compensating for the low initial efficiency. These solutions, however, invited side issues that the cell manufacture process becomes complex and unnecessary materials are left within the cell.

In contrast, a silicon powder characterized by the absence of oxygen is expected to have a far greater charge/discharge capacity than the silicon oxide. On the other hand, the silicon powder undergoes a substantial volume change while occluding and releasing a large amount of lithium, which can cause separation between silicon and binder, breakage of silicon particles, and even separation between the electrode film and the current collector. This leads to such problems as a failure of current collection and cycle degradation. Among approaches contemplated to solve these problems, electrically controlling the capacity is effective as a method of alleviating the volume change by expansion and contraction of silicon, but impractical. Under the circumstances where a charge/discharge capacity as large as that of silicon is not necessary, there is a need for a silicon base material having the advantages of a less volume change and good adhesion to binders or the like, notwithstanding a lower energy density than silicon.

Making extensive investigations from this standpoint on a material which undergoes a less volume change upon occlusion and release of lithium even during full charge/discharge operation and has highly adhesive surfaces, the inventor has found that the above problems of lithium ion secondary cell negative electrode active material are overcome by coating silicon particles or micro-particles with an inert robust material, that is, silicon carbide. The resulting material has an initial efficiency comparable to or surpassing the existing carbonaceous materials and an extremely greater charge/discharge capacity than the carbonaceous materials and achieves drastic improvements in cyclic charge/discharge operation and efficiency thereof.

In one aspect, the present invention provides a silicon composite comprising silicon particles whose surface is at least partially coated with a silicon carbide layer.

In preferred embodiments, the silicon particles have an average particle size of 50 nm to 50 µm; the silicon particle surface is at least partially fused to silicon carbide; a diffraction line attributable to silicon is observed when the silicon composite is analyzed by x-ray diffractometry; the silicon composite contains free carbon in an amount of up to 5% by weight; the silicon composite contains 5 to 90% by weight of zero-valent silicon capable of generating hydrogen gas when reacted with an alkali hydroxide solution; and after the silicon composite is treated with a mixture of hydrofluoric acid and an oxidizing agent and heat dried, silicon carbide is left as the evaporation residue.

In another aspect, the present invention provides a method for preparing the silicon composite defined above, comprising the steps of subjecting a silicon powder to thermochemical vapor deposition treatment with an organic hydrocarbon gas and/or vapor at 900° C. to 1,400° C., and heating the powder for removing a surface excess free carbon layer through oxidation.

Also contemplated herein is a negative electrode material for a non-aqueous electrolyte secondary cell, comprising the silicon composite defined above.

The silicon composite of the present invention maintains the high initial efficiency inherent to silicon, has excellent cycle performance, and alleviates a substantial volume change during charge/discharge cycles so that it is effective as the active material for lithium ion secondary cell negative electrodes. When the silicon composite is used as the active material for a lithium ion secondary cell negative electrode, the resulting lithium ion secondary cell negative electrode material is adherent to a binder, has a high initial efficiency, alleviates a volume change during charge/discharge cycles, and is improved in repeated cyclic operation and efficiency thereof.

DESCRIPTION OF THE PREFERRED EMBODIMENTS

Figure 1:
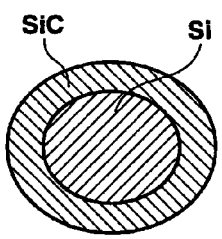
FIG. 1 diagrammatically illustrates in cross section the structure of a silicon composite particle of the invention.

For use as the lithium ion secondary cell negative electrode active material, a siliceous material is expected promising because of its charge/discharge capacity which is several times greater than that of the current mainstream graphite-derived materials, but is prevented from practical use by the degradation of performance with repeated charge/discharge operation and a substantial volume change during charge/discharge operation. The present invention relates to a silicon composite which maintains the high initial efficiency, improves the cycle performance, and alleviates the volume change of the siliceous material. The silicon composite is arrived at by effecting chemical vapor deposition on silicon micro-crystals for coating their surfaces with carbon and forming a silicon carbide layer at the interface, and then removing the carbon layer on the surfaces through oxidation.

More particularly, the silicon powder used herein is metallic silicon of the industrial grade, polycrystalline silicon for semiconductor or semiconductor single-crystal powder which has been previously pulverized to a predetermined particle size, or a microparticulate silicon powder which has been prepared by inert gas quenching, gas phase precipitation or the like. A hydrocarbon compound gas and/or vapor is introduced, after which thermochemical vapor deposition treatment is effected on the silicon powder at 900° C. to 1,400° C., thereby forming a carbon layer on the silicon surface and at the same time forming a silicon carbide layer at the interface between the silicon and the carbon layer. Subsequent heating in an oxidizing atmosphere causes oxidative decomposition of the carbon layer whereby the carbon layer is removed, leaving the silicon particles whose surface is at least partially coated with silicon carbide. In this way, silicon carbide-surface-coated silicon particles, referred to herein as silicon composite particles, are readily prepared. In the silicon composite particles, it is preferred that at least part of the silicon surface be fused to silicon carbide. The outermost coating may be of an electrically conductive material which is not decomposed or altered in the cell although silicon carbide is most preferred from the adhesion standpoint as well.

The silicon composite of the invention should preferably meet the following conditions.

i) By varying the temperature and time of chemical vapor deposition treatment, the thickness and proportion of the silicon carbide layer can be controlled. With this technique, therefore, the quantity of zero-valent silicon serving as a lithium occluding mass, that represents a charge/discharge capacity, can be controlled, and the volume change associated with charge/discharge cycles is eventually alleviated.

ii) In x-ray diffractometry (Cu—Kα) using copper as a counter cathode, a diffraction pattern attributable to silicon, for example, a diffraction peak centering approximately at 2θ=28.4° and attributable to Si(111) is observable.

iii) The quantity of zero-valent silicon capable of occluding and releasing lithium ions when used in a lithium ion secondary cell negative electrode can be measured in terms of the quantity of hydrogen generated upon reaction with an alkali hydroxide according to ISO DIS 9286, the method of measuring free silicon in silicon carbide fine powder. As calculated from the quantity of hydrogen generated, zero-valent silicon is contained in an amount of 5 to 90% by weight, more preferably 20 to 80% by weight, and even more preferably 30 to 60% by weight of the silicon composite.

iv) When the silicon composite is dissolved in hydrofluoric acid containing an oxidizing agent such as hydrogen peroxide, silicon carbide settles down without being dissolved. When this solution is evaporated to dryness, a green tinted residue is left. The silicon composite has the structure shown by a schematic image of FIG. 1.

v) When used as a lithium ion secondary cell negative electrode active material, the silicon composite has an initial efficiency equal to or greater than that of the current graphite-derived materials and undergoes a reduced volume change and minimized cycle degradation as compared with silicon itself.

In the silicon composite powder of the invention, the quantity of free carbon and the quantity of carbon in silicon carbide form are determined from the quantity of free carbon and a difference between the total carbon quantity and the free carbon quantity as measured according to JIS R-6124. The quantity of silicon carbide coated is determined by multiplying the quantity of carbon in silicon carbide form by 40/12=3.33.

Preference is given to a less quantity of free carbon relative to the silicon composite powder (i.e., silicon composite powder surface coated with silicon carbide, prepared by thermal CVD and subsequent oxidative decomposition). Specifically, the quantity of free carbon is preferably up to 5% by weight (5 to 0% by weight), more preferably up to 3% by weight (3 to 0% by weight) and even more preferably up to 2% by weight (2 to 0% by weight) of the silicon composite. The quantity of silicon carbide coated is preferably 10 to 95% by weight, more preferably 20 to 80% by weight, and even more preferably 40 to 70% by weight of the silicon composite. If the quantity of silicon carbide coated is less than 10 wt % of the silicon composite, the silicon composite may have insufficient cycle performance when incorporated in a lithium ion secondary cell. If the quantity of silicon carbide coated is more than 95 wt % of the silicon composite, the inactive silicon carbide coating has an increased thickness, which may inhibit migration of lithium ions and reduce the negative electrode capacity.

Next, the method for preparing the electrically conductive silicon composite according to the invention is described.

The method starts with a silicon powder preferably having an average particle size of 50 nm to 50 µm which is obtained by mechanically pulverizing metallic silicon of the industrial grade, polycrystalline silicon for semiconductor, or semiconductor silicon, or a microparticulate silicon powder preferably having an average particle size of 50 nm to 10 µm, more preferably 100 nm to 5 µm, which is obtained by quenching silicon vapor with an inert gas such as argon. In a fluidizing gas atmosphere containing at least an organic matter gas and/or vapor, thermal chemical vapor deposition (CVD) treatment is effected on the silicon powder at a temperature of preferably 900° C. to 1,400° C., more preferably 900° C. to 1,300° C. The resulting carbon/silicon carbide coated silicon powder is heat treated in an oxidizing atmosphere, typically air, at a temperature of preferably 600 to 1,400° C., more preferably 600 to 900° C., and even more preferably 650 to 800° C., whereby the surface layer of free carbon is oxidatively decomposed away. There are obtained silicon composite particles in which at least part of SiC is fused to or merged with Si.

The silicon particles whose surface will be at least partially coated with silicon carbide should preferably have an average particle size of 50 nm to 50 µm, more preferably 100 nm to 20 µm, even more preferably 200 nm to 10 µm, and most preferably 500 nm to 5 µm. Silicon particles with an average particle size of less than 50 nm may be difficult to handle whereas silicon particles with an average particle size of more than 50 µm may penetrate through the negative electrode film.

At a CVD temperature below 900° C., the formation of a silicon carbide coating proceeds at a slow rate, takes a long time, and becomes inefficient. Inversely, at a CVD temperature above 1,400° C., silicon is melted, deviating from a uniform particle form. With respect to the oxidative decomposition of the free carbon layer, a temperature below 600° C. may induce insufficient oxidative decomposition. The temperature and time for CVD are determined as appropriate relative to the thickness of the carbon layer. During the CVD treatment, particles can agglomerate together. In such a case, the agglomerates are preferably disintegrated on a ball mill or the like in order to facilitate the subsequent oxidative decomposition. In some cases, the CVD treatment may be repeated similarly.

The organic materials used as the raw material for generating the organic matter gas and/or vapor include those which are pyrolyzed at the heat treatment temperature, particularly in a non-oxidizing atmosphere, to form carbon or graphite, for example, hydrocarbons such as methane, ethane, ethylene, acetylene, propane, butane, butene, pentane, isobutane and hexane, alone or in admixture, and mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture. Also useful are gas light oil, creosote oil, anthracene oil and naphtha-cracked tar oil resulting from tar distillation process, alone or in admixture.

The heat treatment of silicon powder and the organic matter gas and/or vapor is not particularly limited as long as a reactor system including a heating mechanism is employed in a non-oxidizing atmosphere. The treatment may be either continuous or batchwise. Depending on a particular purpose, a choice may be made among a fluidized bed reactor, rotary furnace, vertical moving bed reactor, tunnel furnace, batch furnace, and rotary kiln.

The fluidizing gas used herein may be the above-described organic matter gas alone or a mixture of the organic matter gas and a non-oxidizing gas such as Ar, He, $H_2$ and $N_2$. Preferably the linear velocity u (m/sec) of the fluidizing gas is controlled such that the ratio of the linear velocity u to the minimum fluidization velocity $u_{mf}$ may be in the range of 1.5 to 5 (i.e., $1.5 \leq u/u_{mf} \leq 5$), whereby a conductive coating is formed more efficiently. A $u/u_{mf}$ ratio below 1.5 may lead to insufficient fluidization, introducing variations in the conductive coating. Inversely, a $u/u_{mf}$ ratio in excess of 5 may allow for secondary agglomeration of particles, failing to form a uniform conductive coating.

It is noted that the minimum fluidization velocity varies with the size of particles, treating temperature, treating atmosphere and the like. The minimum fluidization velocity is defined as the linear velocity of the fluidizing gas at which a pressure loss across the powder becomes equal to W/A wherein W is the weight of the powder and A is the cross-sectional area of the fluidized layer, when the linear velocity of the fluidizing gas is slowly increased. the minimum fluidization velocity $u_{mf}$ is typically in the range of about 0.1 to 30 cm/sec, preferably about 0.5 to 10 cm/sec. The average particle size of silicon particles imparting $u_{mf}$ in this range is typically 0.5 to 50 μm, and preferably 1 to 30 μm. With an average particle size of less than 0.5 μm, secondary agglomeration may take place, inhibiting effective treatment of surfaces of individual particles. Particles with an average particle size of more than 50 μm may be difficult to uniformly coat on the surface of a current collector in a lithium ion secondary cell.

The thus obtained silicon composite powder of the invention has an average particle size of typically 0.08 to 52 μm, preferably 0.1 to 50 μm, more preferably 0.5 to 40 μm, and most preferably 1 to 20 μm. Too small an average particle size corresponds to too large a surface area, which may lead to too low a negative electrode film density. Too large an average particle size has the risk of penetrating through the negative electrode film. It is noted that throughout the specification, the average particle size is determined as a weight average diameter $D_{50}$ (particle diameter at 50% by weight cumulative, or median diameter) upon measurement of particle size distribution by laser light diffractometry.

The silicon composite powder obtained by the invention may be used as an active material for non-aqueous electrolyte secondary cell negative electrodes. Due to many advantages including a high capacity as compared with the existing graphite and the like, a high initial efficiency as compared with silicon oxide or silicon oxide-derived materials, a controlled volume change upon charge/discharge cycles as compared with silicon, and a good adhesion between particles and a binder, the silicon composite powder may be used to construct a non-aqueous electrolyte secondary cell, especially lithium ion secondary cell, having improved cycle performance.

When a negative electrode is prepared using the silicon composite powder, a conductive agent such as graphite may be added to the silicon composite powder. The type of conductive agent is not particularly limited as long as it is an electron conductive material which does not undergo decomposition or alteration in the cell associated therewith. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

In the embodiment wherein the conductive agent is added, the amount of the conductive agent is preferably 1 to 60% by weight, more preferably 10 to 50% by weight, and most preferably 20 to 50% by weight of a mixture of the silicon composite powder and the conductive agent. A mixture with less than 1% of the conductive agent may fail to withstand expansion and contraction on charge/discharge cycles, whereas a mixture with more than 60% of the conductive agent may have a reduced charge/discharge capacity. The total amount of carbon in said mixture is preferably 25 to 90% by weight, more preferably 30 to 50% by weight. A mixture with less than 25% by weight of carbon may fail to withstand expansion and contraction on charge/discharge cycles, whereas a mixture with more than 90% of carbon may have a reduced charge/discharge capacity.

When the negative electrode is prepared using the silicon composite powder, an organic polymer binder may be added to the silicon composite powder. Examples of organic polymer binder include polymers such as polyethylene, polypropylene, polyethylene terephthalate, aromatic polyamides, aromatic polyimides, cellulose, poly(vinylidene fluoride), polytetrafluoroethylene, and copolymerized fluoro-polymers including tetrafluoroethylene; rubbery polymers such as styrene-butadiene rubber, isoprene rubber, butadiene rubber and ethylene-propylene rubber; flexible polymers such as ethylene-vinyl acetate copolymers and propylene-alpha-olefin copolymers; and ion conductive polymers such as organic polymers (e.g., polyethylene oxide, polypropylene oxide, polyepichlorohydrin, polyphosphazene, polyvinylidene fluoride, polyacrylonitrile), combined with lithium salts or alkali metal salts primarily containing lithium.

With respect to the mixing proportion of the organic polymer binder and the silicon composite powder, it is preferred to use 0.1 to 30 parts by weight, more preferably 0.5 to 20 parts by weight, and even more preferably 1 to 15 parts by weight of the organic polymer binder per 100 parts by weight of the silicon composite powder. Outside the range, too small an amount of the binder may allow silicon composite particles to separate off whereas too large an amount may lead to a reduced percent void and/or a thicker insulating film, prohibiting lithium ions from migration.

In addition to the organic polymer binder, a viscosity adjusting agent may be added, for example, carboxymethyl cellulose, sodium polyacrylate and other acrylic polymers.

The lithium ion secondary cell-forming negative electrode material (or non-aqueous electrolyte secondary cell-forming negative electrode material) of the invention can be shaped into a lithium ion secondary cell-forming negative electrode by the following exemplary procedure. For example, the silicon composite powder, conductive agent, organic polymer binder and other additives are admixed with a solvent suitable for dissolving or dispersing the binder, such as N-methylpyrrolidone or water to form a paste mix, which is applied in a sheet form to a current collector. The current collector may be copper foil, nickel foil or any other materials which are typically used as the negative electrode current collector. The method of shaping the mix into a sheet is not particularly limited and any of well-known methods may be used.

Using the lithium ion secondary cell-forming negative electrode thus obtained, a lithium ion secondary cell can be fabricated. The lithium ion secondary cell thus constructed is characterized by the use of the silicon composite as the negative electrode active material while the materials of the positive electrode, electrolyte, and separator and the cell design are not critical. For example, the positive electrode active material used herein may be selected from transition metal oxides such as $LiCoO_2$, $LiNiO_2$, $LiMn_2O_4$, $V_2O_6$, $MnO_2$, $TiS_2$ and $MoS_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyl-tetrahydrofuran, alone or in admixture. Use may also be made of other various non-aqueous electrolytes and solid electrolytes.

EXAMPLE

Examples of the invention are given below by way of illustration and not by way of limitation. In Examples, all parts and percents are by weight unless otherwise stated. The average particle size is determined as a cumulative weight average diameter $D_{50}$ (or median diameter) upon measurement of particle size distribution by laser light diffractometry.

Example 1

To illustrate the structure of the silicon composite of the invention, a silicon composite was prepared using a milled powder of industrial metallic silicon.

A metallic silicon mass of industrial grade was crushed on a crusher, and milled on a ball mill and then a bead mill using hexane as a dispersing medium until fine particles having a predetermined average particle size (about 4 μm) were obtained. A vertical reactor was charged with the silicon fine powder, and thermal CVD was conducted in a stream of a methane-argon mixture at 1,150° C. for an average residence time of about 4 hours. The black mass thus obtained was heated in air at 800° C. for one hour for removing free carbon from the surface. After the oxidizing treatment, the mass was disintegrated on an automated mortar into a fine powder having an average particle size of about 4 μm.

Figure 2:
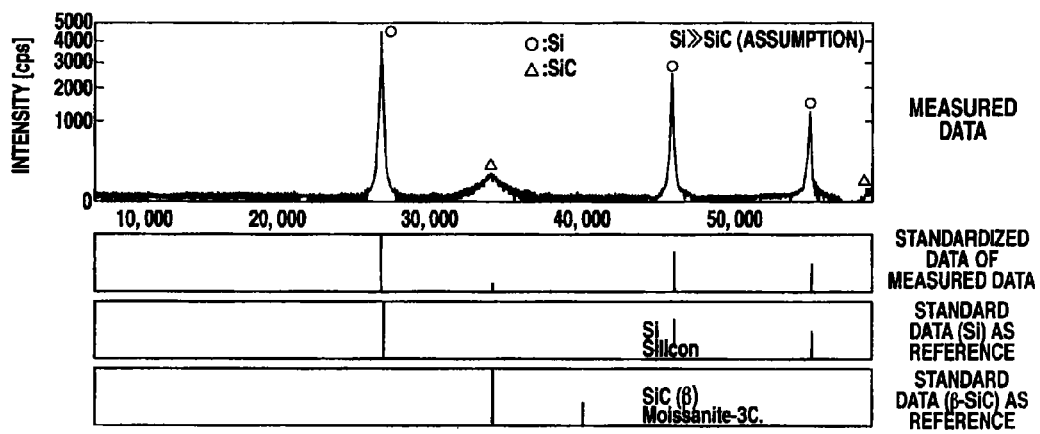
FIG. 2 is a chart of x-ray diffraction (Cu—Kα) on a silicon composite obtained by starting with a silicon powder, conducting thermal CVD using methane gas, and conducting oxidative decomposition for removing carbon.

The silicon composite powder was analyzed by x-ray diffractometry (Cu—Kα). FIG. 2 illustrates an x-ray diffraction pattern, which proves the presence of a diffraction line near 2θ=28.4° attributable to Si(111) of crystalline silicon (diamond structure). It is thus seen that fine silicon crystals were left. Also the quantity of active silicon or zero-valent silicon was measured in terms of the quantity of hydrogen generated upon reaction with a sodium hydroxide solution according to ISO DIS 9286, the method of measuring free silicon in silicon carbide fine powder. The quantity of active silicon in the silicon composite powder was found to be about 62%, confirming the presence of zero-valent silicon having a lithium occluding ability.

Further, an aliquot (about 2 g) of the silicon composite powder was placed on a platinum dish, to which a hydrofluoric acid/hydrogen peroxide mixture was added for dissolving the powder. The presence of a precipitate was observed. The liquid mixture was evaporated to dryness by heating in a draft, with a greenish gray residue characteristic of silicon carbide being observed.

The quantities of free carbon and total carbon were measured to be 1.5% and 12.3%, respectively, according to JIS R-6124, the method of chemical analysis on silicon carbide abrasives. The difference (10.8%) between them is attributed to carbon in silicon carbide form. It is thus seen that 10.8×3.33=36.0% is present as silicon carbide.

The silicon composite powder has a structure in which the surface of a silicon particle is coated with silicon carbide as shown in FIG. 1

Example 2

A metallic silicon mass of industrial grade (low Al silicon available from SIMCOA Operations Pty. Ltd., Australia, Al 0.4%, Fe 0.21%, etc.) was crushed on a jaw crusher and atomized on a jet mill, obtaining fine silicon particles having an average particle size of about 4 μm. The silicon fine powder was fed to a rotary kiln reactor, and thermal CVD was conducted in a stream of a methane-argon mixture at 1,200° C. for an average residence time of about 2 hours. The black mass thus obtained was disintegrated on an automated mortar. The powder was fed to the rotary kiln reactor again, and thermal CVD was conducted in a stream of a methane-argon mixture at 1,200° C. for an average residence time of about 2 hours. The black mass thus obtained was similarly disintegrated on the automated mortar again. There was obtained a black powder having a total carbon content of 47% and a free carbon content of 36%. The black powder was then placed in an alumina bowl, and heated in air at 800° C. for one hour for oxidizing and removing free carbon on the surface, yielding a blackish gray fine powder.

The fine powder had a total carbon content of 12.1%, a free carbon content of 1.3%, an oxygen content of 1.5%, and an average particle size of 4.0 μm. On x-ray analysis, a diffraction line attributable to silicon was found. Upon treatment with a hydrofluoric acid/hydrogen peroxide mixture, a precipitate in the solution was observed, and after evaporation to dryness, a grayish green residue was observed. These data confirmed the structure in which the surface of a silicon particle is coated with silicon carbide.

From the analytical data, the powder was found to have a composition of 62.7% silicon and 36.0% silicon carbide.

Cell Test

The evaluation of silicon composite powder as the negative electrode active material for a lithium ion secondary cell was carried out by the following procedure which was common to all Examples and Comparative Examples. A mixture was first obtained by adding synthetic graphite (average particle diameter $D_{50}$=5 μm) to the silicon composite in such amounts that the total of carbon in synthetic graphite and carbon deposited on the silicon composite was 40%. To the mixture were added 3.0 pbw of carboxymethyl cellulose (ammonium salt) as a water-soluble thickener, 6.0 pbw of a styrene-butadiene copolymer latex (solids 50%) as a binder using water as a dispersing medium, and 50 pbw of water. The mixture was agitated to form a slurry. The slurry was coated onto a copper foil of 20 μm gage and dried at 120° C. for one hour. Using a roller press, the coated foil was shaped under pressure into an electrode sheet, of which 2 cm² discs were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K. K.), a charge/discharge test was carried out on the cell. Charging was conducted with a constant current flow of 3 mA until the voltage of the test cell reached 0 V, and after reaching 0 V, continued with a reduced current flow so that the cell voltage was kept at 0 V, and terminated when the current flow decreased below 100 μA. Discharging was conducted with a constant current flow of 3 mA and terminated when the cell voltage rose above 2.0 V, from which a discharge capacity was determined.

The initial charging capacity and efficiency of this lithium ion secondary cell were determined. By repeating the above operations, the charge/discharge test on the lithium ion secondary cell was carried out 50 cycles. The discharging capacity on the 50th cycle was measured, from which a percent cycle retention (after 50 cycles) was computed. The test results are shown in Table 1.

Example 3

The metallic silicon powder with an average particle size of about 4 μm obtained through the pulverization in Example 2 was milled on a bead mill using hexane as a dispersing medium to a predetermined particle size (the target average particle size below 1 μm). A milled silicon powder having an average particle size of about 0.8 μm was obtained. The resulting slurry was passed through a filter for removing hexane, leaving a cake-like mass containing hexane, which was placed in an alumina bowl. The bowl was set in a lateral reactor, and thermal CVD was conducted in a stream of a methane-argon mixture at 1,150° C. for about 2 hours. The black mass thus obtained was disintegrated on an automated mortar. The powder was placed in the alumina bowl and the reactor again, and thermal CVD was conducted under the same conditions. The black mass thus obtained was similarly disintegrated on the automated mortar again. There was obtained a black powder having a total carbon content of 59% and a free carbon content of 41%. The black powder was then placed in an alumina bowl, and heated in air at 800° C. for one hour for oxidizing and removing free carbon on the surface, yielding a blackish gray fine powder.

The fine powder had a total carbon content of 19.3%, a free carbon content of 1.8%, an oxygen content of 1.8%, and an average particle size of about 1.1 μm. On x-ray analysis, a diffraction line attributable to silicon was found. Upon treatment with a hydrofluoric acid/hydrogen peroxide mixture, a precipitate in the solution was observed, and after evaporation to dryness, a grayish green residue was observed. These data confirmed the structure in which the surface of a silicon particle is coated with silicon carbide.

From the analytical data, the powder was found to have a composition of 39.9% silicon and 58.3% silicon carbide.

As in Example 2, this silicon composite powder was examined by a charge/discharge test as a lithium ion secondary cell negative electrode material. The results are also shown in Table 1.

Comparative Example 1

The silicon fine powder resulting from pulverization in Example 2 was fed to a rotary kiln reactor, and thermal CVD was conducted in a stream of a methane-argon mixture at 1,200° C. for an average residence time of about 2 hours. The black mass thus obtained was disintegrated on an automated mortar. The powder was fed to the rotary kiln reactor again, and thermal CVD was conducted in a stream of a methane-argon mixture at 1,200° C. for an average residence time of about 2 hours. The black mass thus obtained was similarly disintegrated on the automated mortar again. There was obtained a black powder having a total carbon content of 47.2% and a free carbon content of 36.3%. As in Example 2, this black powder was examined by a charge/discharge test as a lithium ion secondary cell negative electrode material. The results are also shown in Table 1.

Comparative Example 2

The silicon fine powder resulting from pulverization in Example 2 was fed to a vertical tubular furnace (inner diameter ~50 mm), and thermal CVD was conducted in a stream of an acetylene-argon mixture at 800° C. for 3 hours. The resulting black mass was a carbon-CVD-treated silicon powder, which on analysis had a total carbon content of 41% and a free carbon content of 40%. The black mass was disintegrated on an automated mortar, after which free carbon was oxidized and removed as in Example 2.

The fine powder had a total carbon content of 2.3%, a free carbon content of 1.8%, an oxygen content of 1.3%, and an average particle size of 4.1 μm. On x-ray analysis, a diffraction line attributable to silicon was found. Upon treatment with a hydrofluoric acid/hydrogen peroxide mixture, little precipitate was observed, and after evaporation to dryness, no residue was observed.

From the analytical data, the powder was found to have a composition of 96.5% silicon and 1.7% silicon carbide.

As in Example 2, this powder was examined by a charge/discharge test as a lithium ion secondary cell negative electrode material. The results are also shown in Table 1.

TABLE 1

|  | Example | | Comparative Example | |
|---|---|---|---|---|
|  | 2 | 3 | 1 | 2 |
| Silicon composite | | | | |
| Average particle size (μm) | 4.0 | 1.1 | 4.9 | 4.1 |
| Total carbon content (wt %) | 12.1 | 19.3 | 47.2 | 2.3 |
| Free carbon content (wt %) | 1.3 | 1.8 | 36.3 | 1.8 |
| Amount of silicon carbide coated (wt %) | 36.0 | 58.3 | 36.3 | 1.7 |
| Silicon content (wt %) | 62.7 | 39.9 | 27.4 | 96.5 |
| Test results | | | | |
| Initial charging capacity* (mAh/g) | 1570 | 1210 | 1050 | 2630 |
| Initial efficiency* (%) | 93 | 90 | 89 | 89 |
| Cycle retention after 50 cycles (%) | 93 | 90 | 89 | 25 |

*calculated based on the total weight of negative electrode film including graphite Japanese Patent Application No. 2004-195586 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of improving cycle retention in cyclic charge/discharge operation of a non-aqueous electrolyte secondary cell, comprising repeated charging and discharging of a lithium ion secondary cell comprising a positive electrode, a negative electrode, a non-aqueous electrolyte solution, and a separator, wherein said negative electrode comprises a negative electrode active material which comprises:

a silicon composite obtained by a thermal chemical vapor deposition treatment on silicon particles having an average particle size of from 50 nm to 50 μm at a temperature of 900° C. to 1,400° C. in a fluidizing gas atmosphere comprising a hydrocarbon or mono- to tri-cyclic aromatic hydrocarbon, to obtain a carbon/silicon carbide coated silicon powder, and heat-treating said carbon/silicon carbide coated silicon powder in an oxidizing atmosphere at a temperature of 600° C. to 1,400° C. to oxidatively decompose a surface layer of free carbon, wherein the silicon composite comprises silicon particles having an average particle size of from 50 nm to 50 μm whose surfaces are coated with a fused layer of silicon carbide and comprise free carbon in an amount of from 1.3 wt. % to 2 wt. % based on the total weight of said silicon composite, wherein said silicon carbide is present in an amount of from 10 wt. % to 58.3 wt. % based on the total weight of said silicon composite, wherein said silicon composite is in the form of a powder having an average particle size of from 0.08 µm to 52 µm, and wherein said silicon composite further comprises zero-valent silicon in an amount of from 39.9 wt. % to 90 wt. % based on the total weight of said silicon composite, wherein said zero-valent silicon is capable of generating hydrogen gas when reacted with an alkali hydroxide solution.

2. The method according to claim 1, wherein said silicon carbide is present in an amount of from 20 wt. % to 58.3 wt. % based on the total weight of said silicon composite.

3. The method according to claim 1, wherein said silicon particles have an average particle size of from 100 nm to 20 µm.

4. The method according to claim 1, wherein said silicon composite is in the form of a powder having an average particle size of from 0.5 µm to 40 µm.

5. The method according to claim 1, wherein said zero-valent silicon is present in an amount of from 39.9 wt. % to 80 wt. % based on the total weight of said silicon composite.

6. The method according to claim 1, wherein a diffraction peak attributable to silicon is observed when said silicon composite is analyzed by diffractometry.

7. The method according to claim 6, wherein said diffraction peak centers at approximately $2\theta=28.4°$ and is attributable to Si(111) when said silicon composite is analyzed by x-ray diffractometry.

8. The method according to claim 1, wherein the silicon particles comprise free carbon in an amount of from 1.3 wt. % to 1.8 wt. % based on the total weight of the silicon composite.

9. The method according to claim 1, wherein the negative electrode material provides an initial efficiency of 90-93% and a cycle retention after 50 cycles of 90-93% in a test lithium ion secondary cell.

10. The method according to claim 9, wherein the negative electrode material provides an initial charging capacity of 1,210-1,570 mAh/g in the test lithium ion secondary cell.

11. The method according to claim 10, wherein the silicon composite has an average particle size of 1.1-4.0 µm, a total carbon content of 12.1-19.3 wt. %, a silicon carbide content of 36.0-58.3 wt. % and a silicon content of 39.9-62.7 wt. %, in each case based on the total weight of the silicon composite.

12. The method according to claim 1, wherein the silicon composite has a silicon carbide content of 36.0-58.3 wt. % and a silicon content of 39.9-62.7 wt. %, in each case based on the total weight of the silicon composite.

13. The method according to claim 1, wherein said silicon particles have an average particle size of from 100 nm to 5 µm.

* * * * *